US010663979B2

(12) United States Patent
Grundey et al.

(10) Patent No.: US 10,663,979 B2
(45) Date of Patent: May 26, 2020

(54) AUTONOMOUS ALL-TERRAIN VEHICLES FOR HERDING

(71) Applicant: Honda Motor Co., Ltd., Tokyo (JP)

(72) Inventors: Jason W. Grundey, Wapakoneta, OH (US); Richard M. Lowery, Jr., London, OH (US); Naoki Murasawa, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/138,012

(22) Filed: Sep. 21, 2018

(65) Prior Publication Data

US 2020/0097023 A1 Mar. 26, 2020

(51) Int. Cl.
G05D 1/02 (2020.01)
G05F 1/08 (2006.01)
A01K 29/00 (2006.01)
G05D 1/00 (2006.01)

(52) U.S. Cl.
CPC ........... G05D 1/0295 (2013.01); A01K 29/00 (2013.01); G05D 1/0088 (2013.01); G05D 1/0246 (2013.01); G05D 1/0278 (2013.01); G05D 2201/0201 (2013.01)

(58) Field of Classification Search
CPC .. G05D 1/0295; G05D 1/0246; G05D 1/0278; G05D 1/0088; G05D 2201/0201; A01K 29/00
See application file for complete search history.

(56) References Cited

U.S. PATENT DOCUMENTS

| 6,439,162 B1 * | 8/2002 | van den Berg ...... A01K 1/0103 119/174 |
| 7,705,736 B1 * | 4/2010 | Kedziora ............. A01K 11/008 340/573.3 |
| 8,074,320 B2 * | 12/2011 | Batchelder ............. A01G 20/47 15/319 |
| 9,979,463 B1 * | 5/2018 | Shafer ................ H04B 7/18504 |

(Continued)

FOREIGN PATENT DOCUMENTS

| JP | 2011-204117 A | 10/2011 |
| JP | 2013-061852 A | 4/2013 |

OTHER PUBLICATIONS

"Why we programmed a robot to act like a sheepdog" https://theconversation.com/why-we-programmed-a-robot-to-act-like-a-sheepdog-96961.

(Continued)

Primary Examiner — Tyler J Lee
(74) Attorney, Agent, or Firm — Honda Patents & Technologies North America, LLC; Mark E. Duell

(57) ABSTRACT

A system for herding a group of animals includes a master autonomous vehicle including a controller, a camera in communication with the controller for supplying image data to the controller, a global positioning satellite apparatus for determining a position of the master autonomous vehicle, and a ranging unit for determining a distance to an object to the autonomous vehicle in communication with the controller. The system further includes a plurality of client autonomous vehicles, each of the plurality of client autonomous vehicles being operated by the controller of the master autonomous vehicle and a herding apparatus for keeping the group of animals between the master autonomous vehicle and each of the plurality of client autonomous vehicles.

16 Claims, 6 Drawing Sheets

(56) References Cited

U.S. PATENT DOCUMENTS

| | | | |
|---|---|---|---|
| 2010/0017035 A1* | 1/2010 | Van Den Berg | A01K 1/01 700/259 |
| 2011/0185975 A1* | 8/2011 | Van Den Berg | A01K 1/01 119/57.92 |
| 2014/0333439 A1* | 11/2014 | Downing | A01K 29/005 340/573.3 |
| 2016/0370263 A1* | 12/2016 | Duesterhoft | B64C 39/024 |
| 2017/0083748 A1* | 3/2017 | Zhou | G06T 7/248 |
| 2017/0086428 A1* | 3/2017 | Horton | A01K 29/005 |
| 2017/0086429 A1* | 3/2017 | Horton | A01K 5/01 |
| 2017/0156288 A1* | 6/2017 | Singh | A01K 11/002 |
| 2017/0202185 A1* | 7/2017 | Trumbull | G16H 40/67 |
| 2018/0049407 A1* | 2/2018 | Castelli | A01K 11/008 |
| 2018/0146645 A1* | 5/2018 | Arbel | A01K 11/001 |
| 2018/0160649 A1* | 6/2018 | Hicks | G01N 33/18 |
| 2018/0357909 A1* | 12/2018 | Eyhorn | B64C 39/024 |

OTHER PUBLICATIONS

Andrew King et al., "Selfish-herd behaviour of sheep under threat", Current Biology, Jul. 24, 2012, vol. 22, Issue 14, pp. R561-562.

* cited by examiner

AUTONOMOUS ALL-TERRAIN VEHICLES FOR HERDING

TECHNICAL FIELD

The embodiments disclosed herein are related to the field of autonomous vehicles, and more particularly when used as a system for herding animals.

BACKGROUND

An autonomous vehicle is an unmanned vehicle that is generally capable of sensing its environment and navigating without input from a driver. An autonomous vehicle may perform autonomous driving by recognizing and determining surrounding environments through various sensors attached to the autonomous vehicle. Further, an autonomous vehicle may enable a destination to be set and move to the set destination via autonomous driving.

Herding is the act of bringing individual animals together into a group, maintaining the group, and moving the group from place to place—or any combination of those. Herding is used in agriculture to manage domesticated animals. Herding can be performed by people or trained animals such as herding dogs that control the movement of livestock under the direction of a person.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a system for herding a group of animals includes a master autonomous vehicle, the master autonomous vehicle including a controller, a camera in communication with the controller for supplying image data to the controller, a global positioning satellite apparatus for determining a position of the master autonomous vehicle, and a ranging unit for determining a distance to an object to the autonomous vehicle in communication with the controller. The system further includes a plurality of client autonomous vehicles, each of the plurality of client autonomous vehicles being operated by the controller of the master autonomous vehicle and a herding apparatus for keeping the group of animals between the master autonomous vehicle and each of the plurality of client autonomous vehicles.

According to another aspect, a system for herding a group of animals includes a master autonomous vehicle, the master autonomous vehicle including a controller, a vehicle-to-vehicle communication unit, a camera in communication with the controller for supplying image data to the controller, a global positioning satellite apparatus for determining a position of the master autonomous vehicle, and a ranging unit for determining a distance to an object to the autonomous vehicle in communication with the controller. The system further includes a plurality of client autonomous vehicles, each of the plurality of client autonomous vehicles being operated by the controller of the master autonomous vehicle, each of the plurality of client autonomous vehicles including a client communication unit for communicating with the master autonomous vehicle, a client controller in communication with the controller via the client communication unit, a client camera in communication with the controller for supplying image data to the client controller, a client global positioning satellite apparatus for determining a position of each of the plurality of client autonomous vehicles, and a ranging unit for determining a distance to an object in communication with the client controller. The system also includes a herding apparatus for keeping the group of animals between the master autonomous vehicle and each of the plurality of client autonomous vehicles.

According to yet another aspect, a system for herding a group of animals includes a master autonomous vehicle, the master autonomous vehicle including a controller, a master communication unit, and a cellular communication unit for communication with a user. The system further includes a plurality of client autonomous vehicles, each of the plurality of client autonomous vehicles being operated by the controller of the master autonomous vehicle, each of the plurality of client autonomous vehicles including a client communication unit for communicating with the master communication unit of the master autonomous vehicle, and a client controller in communication with the controller via the client communication unit. The system also includes a herding apparatus for keeping the group of animals between the master autonomous vehicle and each of the plurality of client autonomous vehicles.

According to still yet another aspect, an autonomous vehicle for herding a group of animals includes a controller, a camera in communication with the controller for supplying image data to the controller, a global positioning satellite apparatus for determining a position of the autonomous vehicle, a ranging unit for determining a distance to one of the group of animals and in communication with the controller, and a herding apparatus for herding the group of animals.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
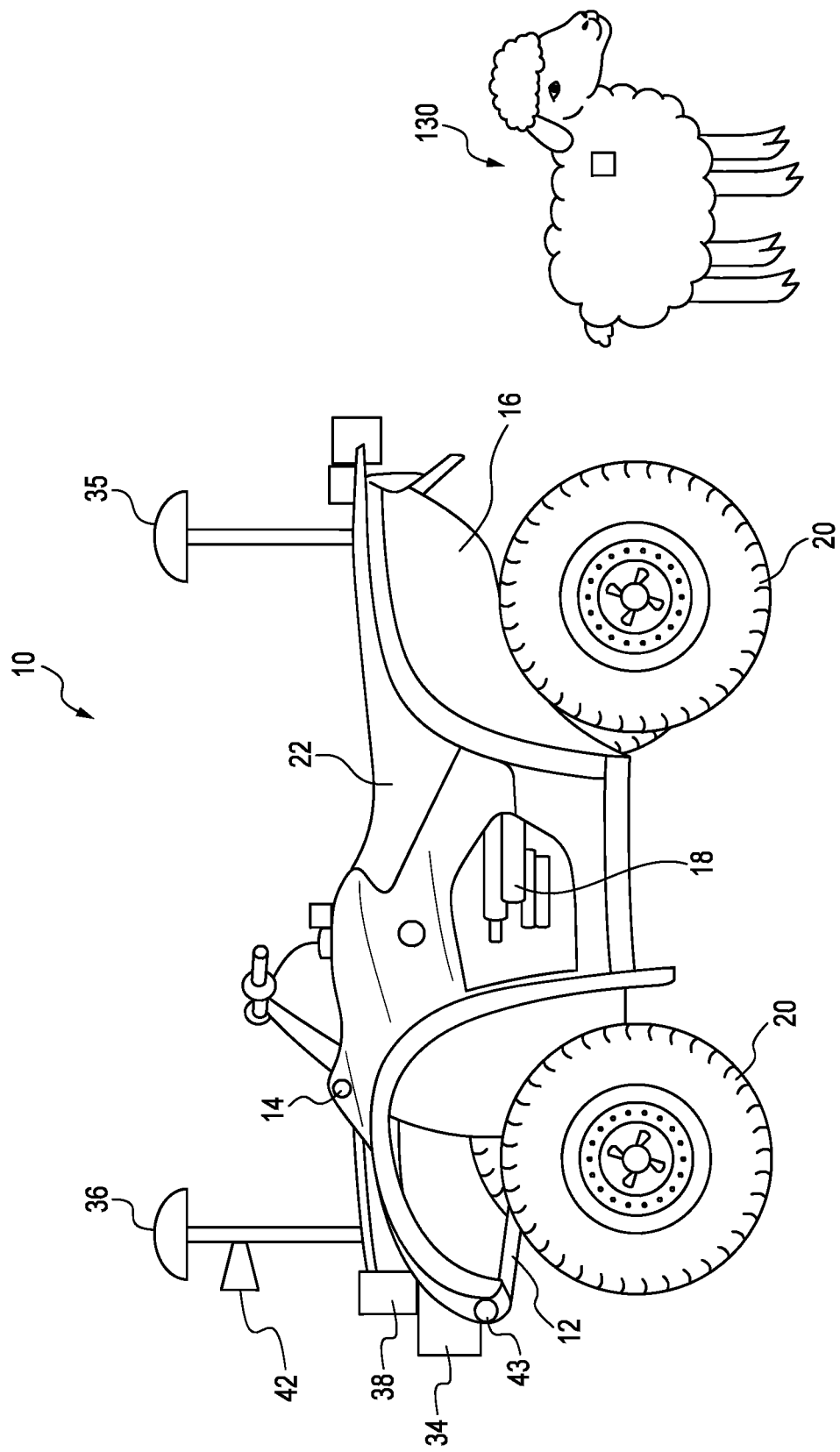
FIG. 1 is a side view of an autonomous vehicle for use with the disclosed system for herding a group of animals.

FIG. 1 is a side view of an autonomous vehicle 10 to be used as a master autonomous vehicle 10a, a client autonomous vehicle 10b, or a wrangler autonomous vehicle 10c according to the embodiments described herein. The autonomous vehicle 10 includes a vehicle frame 12 and a body 14 attached to the vehicle frame 12. A vehicle propulsion unit 16 may also be attached to the frame 12. The vehicle propulsion unit 16 may be a four-stroke internal combustion engine, a two-stroke internal combustion engine, an electric motor, or any other appropriate motive apparatus. In the case where the vehicle propulsion unit 16 is an internal combustion engine, the autonomous vehicle may further include a fuel tank. In the case where the vehicle propulsion unit 16 is an electric motor, as illustrated in FIG. 1, the autonomous vehicle 10 may further include a battery or battery pack 18 for storing electric charge. The autonomous vehicle 10 may further include a plurality of wheels 20, four (4) in the embodiment illustrated in FIG. 1, attached to the vehicle frame 12 and driven by the vehicle propulsion unit 16. The autonomous vehicle 10 also may include a seat 22 or a plurality of seats, one seat 22 in the embodiment illustrated in FIG. 1. The body 14 of the autonomous vehicle 10 may also be configured to hold equipment, supplies, and the like. Operation of the autonomous vehicle 10 is further described in U.S. patent application Ser. No. 15/910,832 for "Control System for Autonomous All-Terrain Vehicle (ATV)," filed Mar. 2, 2018 and U.S. patent application Ser. No. 15/915,174 for "Autonomous All-Terrain Vehicle (ATV)," filed Mar. 8, 2018, both of which are hereby incorporated by reference in their entirety.

Figure 2:
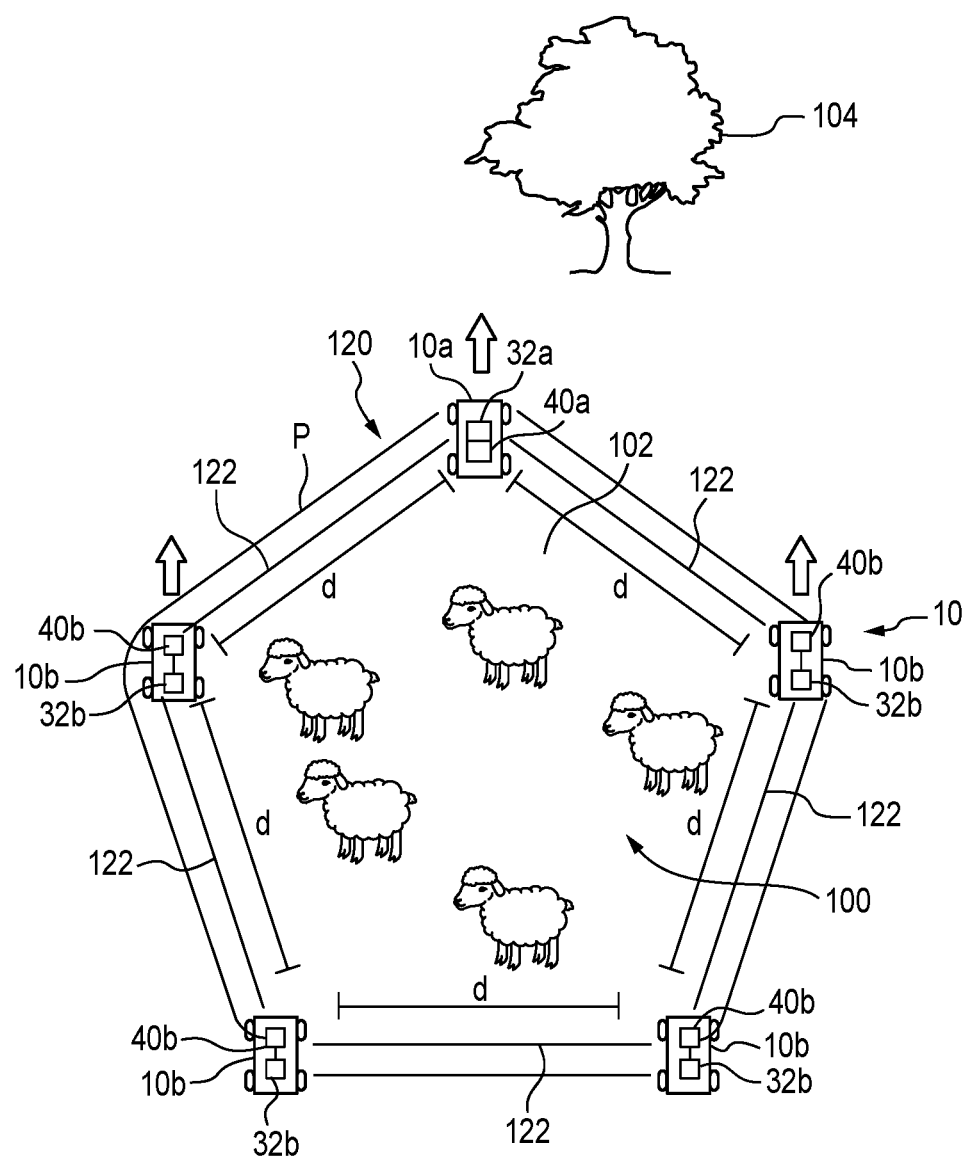
FIG. 2. is a schematic representation of a one embodiment of the system for herding animals using autonomous vehicles depicted in FIG. 1.

As illustrated in FIG. 2, there is an identified need to herd a group of animals 100 that move about a pasture 102, such as a lea, grasslands, and the like for grazing, feeding, exercise and the like. The group of animals 100 may be of cattle, sheep, llamas, alpacas, goats, bison, or any other animals that move about in herds for socialization, safety, and grazing. In order to control and move a group of animals 100, human labor, in the form or ranch hands or cowboys, would move the herds, or trained animals, such as dogs, would be used to move these animals. However, an autonomous herding system 110 utilizing autonomous vehicles 10 may be used to herd the group of animals 10 without endangering ranch hands, working animals, and the like.

FIG. 2 illustrates a first embodiment of a herding system 110 for herding a group of animals 100. The herding system 110 includes a master autonomous vehicle 10a, and a plurality of client autonomous vehicles 10b that surround the group of animals 100 in pasture 102. The master autonomous vehicle 10a includes the master controller 32a that controls the herding system 110. As illustrated in FIG. 1, each autonomous vehicle 10 used as part of the herding system 110 may further include a camera 34 for taking images of the group of animals 100 and the pasture 102. The camera 34 may be a thermal imaging camera in order to best identify each animal 130 in the group of animals 100. A ranging unit 36 is provided for determining distance to the group of animals 100 and objects 104 in the pathway of the herding system 110 that need to be avoided, such as a tree illustrated in FIG. 2. The ranging unit 36 may be any unit known in the art such as a radar or LIDAR unit. Further, a global positioning system ("GPS") unit 38 is provided for determining the position of the herding system. The camera 34, ranging unit 36, and GPS unit 38 for each autonomous vehicle 10 are in electronic communication with the master controller 32a of the master autonomous vehicle 10a to make course decisions for the herding system 110.

The herding system 110 further includes a plurality of client autonomous vehicles 10b. Each of the client autonomous vehicles 10b is operated to maintain a specific formation, with each of the client autonomous vehicles 10b and the master autonomous vehicle 10a specified distances d from and positions relative to each other. In the embodiment illustrated in FIG. 2, the herding system 110 includes four (4) client autonomous vehicles 10b, which when in formation with the master autonomous vehicle 10a maintain a pentagon-shaped formation. The number of client autonomous vehicles 10b may be varied by the required size of the herding system 110 to herd properly the group of animals 100.

Each of the client autonomous vehicles 10b, as illustrated in FIG. 2, include a client controller 32b that is in communication with the master controller 32a of the master autonomous vehicle 10a. The master controller 32a and each client controller 32b may communication wirelessly. The master autonomous vehicle may have a master communication unit 40a in electric communication unit with the master controller 32a, and each of the client autonomous vehicles 10b may include a client communication unit in electronic communication with the client controller for the respective client autonomous vehicles 10b. The master communication unit 40a and each of the client communication units 40b operate under a protocol selected from the group comprising Bluetooth, BLE, ZigBee, Z-Wave, 6LoWPAN, Wi-Fi, 2G, 3G, 4G, 5G, LTE, near field communication, radio frequency identification, SigFox, LoRaWAN, Ingenu, Weightless-N, Weightless-P, Weightless-W, ANT, ANT+, DigiMesh, MiWi, EnOcean, Dash7, and WirelessHART. The client controller 32b controls each of the associated client autonomous vehicles 10b, while the master controller 32a makes the course decisions, speed, and the like for the herding system 110.

The master communication unit 40a may also include an embedded cellular telephone to enable communication from a user (not shown) at a remote location to the master autonomous vehicle 10a and the herding system 110. The user may provide commands to the herding system about where to move the group of animals 100 or to return the group of animals to a home base of operation, such as a barn, cattle stall, livestock shed, or cot.

Figure 3:
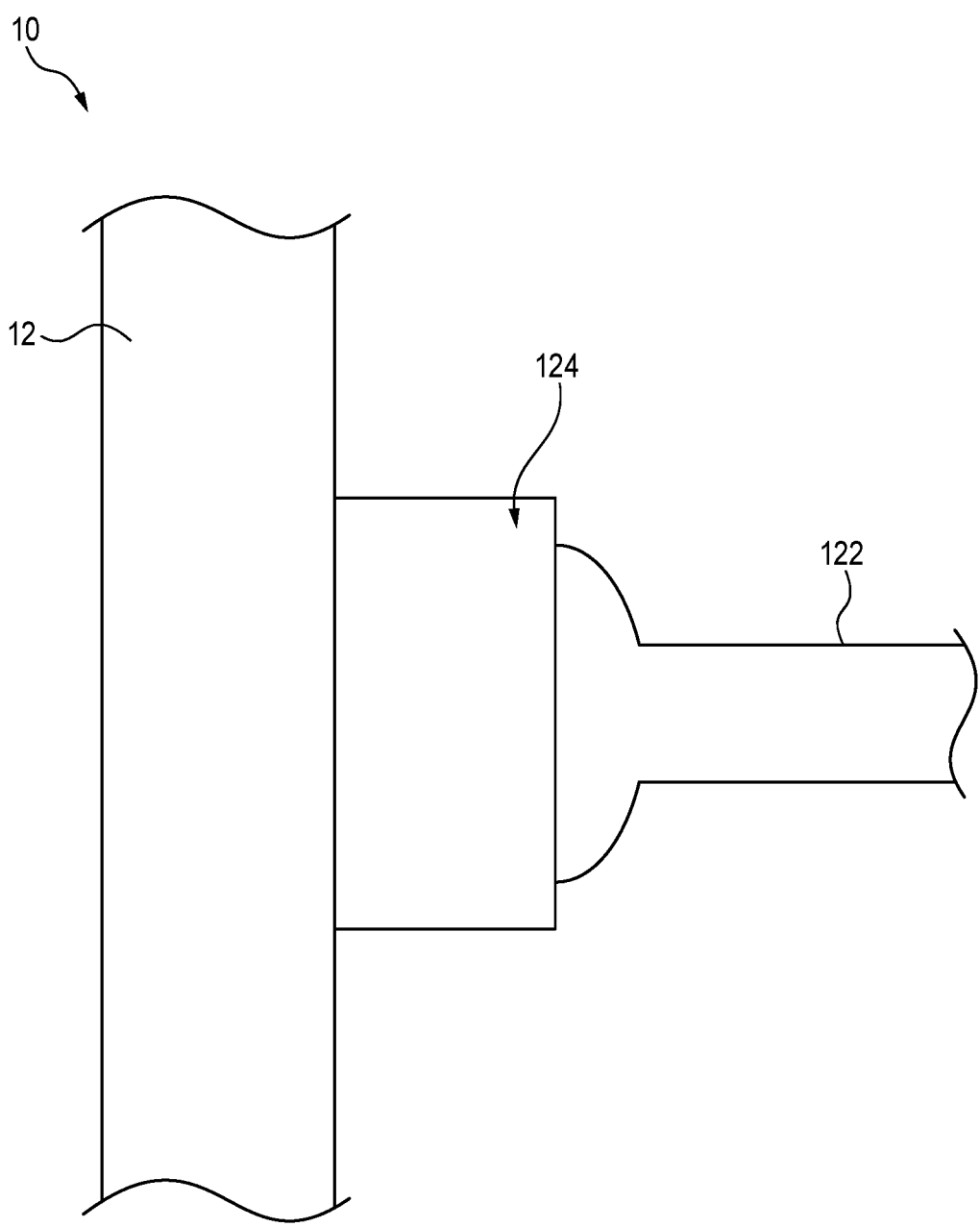
FIG. 3 illustrates a ball joint for connecting a bar to the autonomous vehicle depicted in FIG. 1.

The herding system 110 may also include a herding apparatus 120 in the form of physical restraints 121 extending around the outer perimeter P of the formation of the autonomous vehicles 10 to form a fence. A ranch hand or operator may set the master autonomous vehicle 10a and the client autonomous vehicles 10b around the group of animals 100 and attach the herding apparatus 120, after which the system may operate fully in autonomously. In one embodiment, the physical restraint may be a plurality of bars 122 rotatably connected to the master autonomous vehicle 10a and the client autonomous vehicles 10b as illustrated in FIG. 2. In the embodiment further illustrated in FIG. 3, the bars 122 are connected to the associated master or client autonomous vehicles 10a, 10b by a ball joint 124, although any rotatable or flexible connection that permits flexibility and movement due to slight elevation changes, such as one of the autonomous vehicles 10 passing over a rock, may be used.

Figure 4:
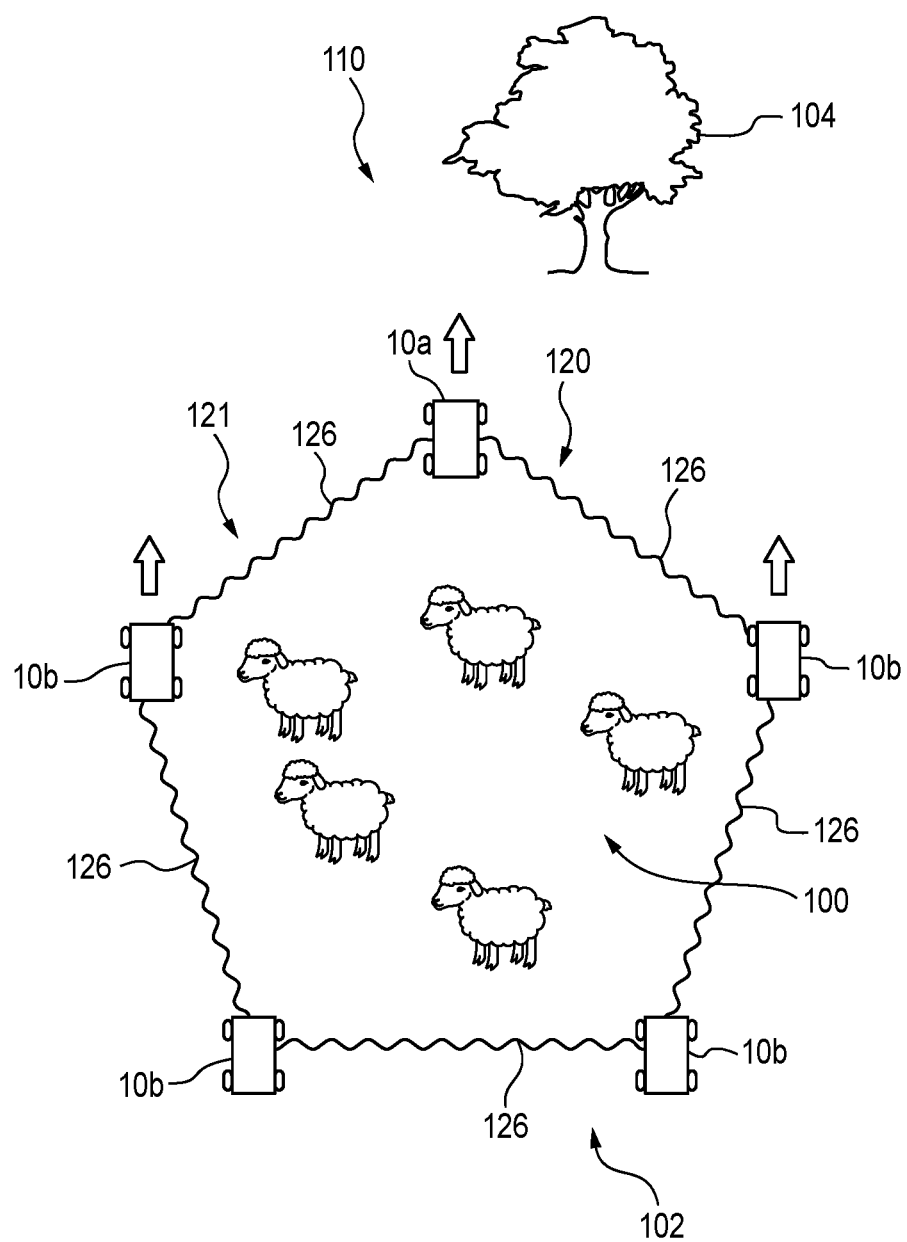
FIG. 4 is a schematic representation of another embodiment of the system for herding animals using autonomous vehicles depicted in FIG. 1.

In another embodiment, illustrated in FIG. 4, the physical restraints 121 may be a plurality of flexible nets or ropes 126 connected to the master autonomous vehicle 10a and the client autonomous vehicles 10b. The flexible nets or ropes 126 may be used to provide flexibility in both the vertical and horizontal directions as the master autonomous vehicle 10a and the client autonomous vehicles 10b are not likely traveling over a flat surface. The flexible nets or ropes 126 may be connected to the associated master or client autonomous vehicles 10a, 10b by any suitable fastener known to those skilled in the art.

Figure 5:
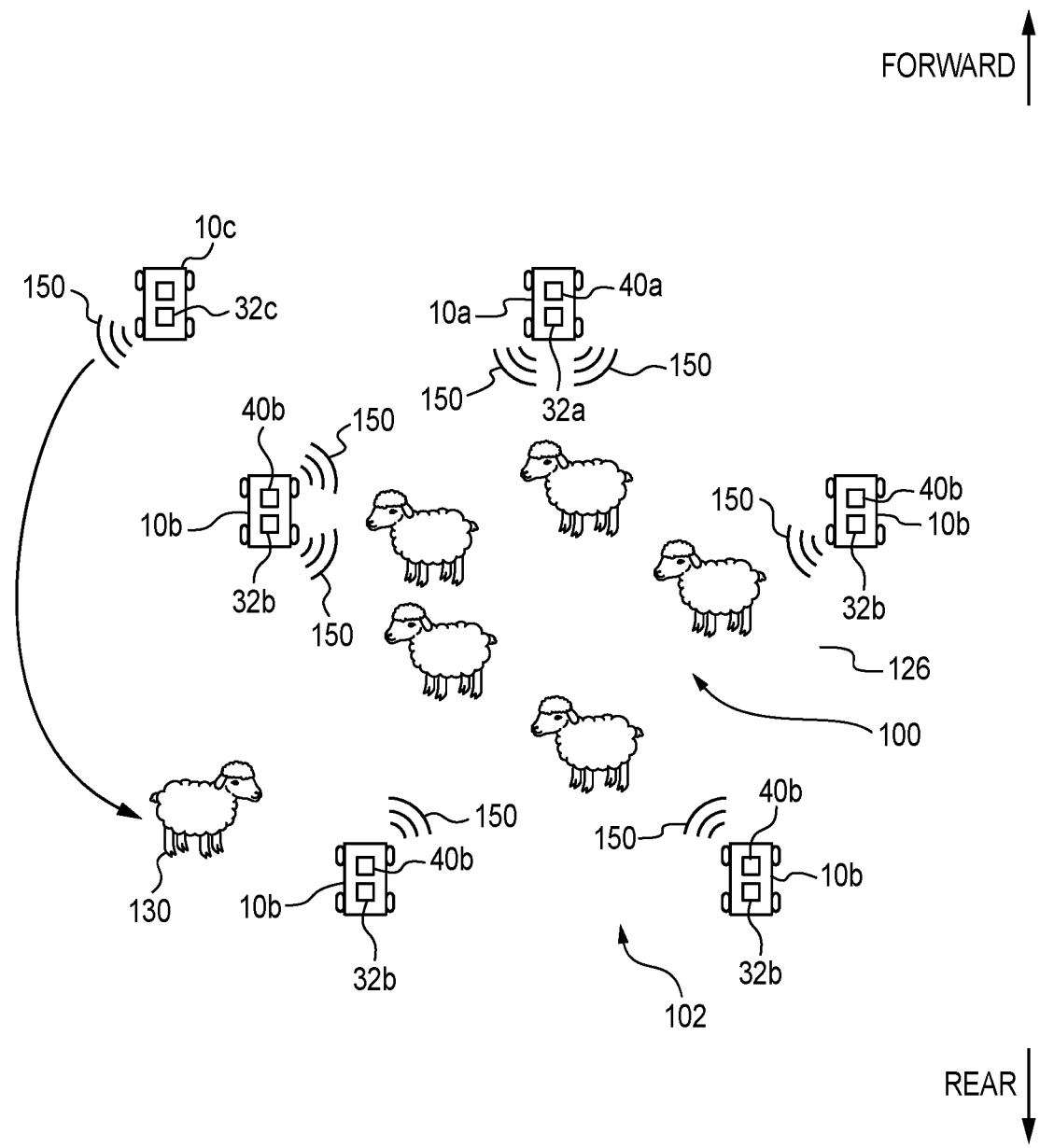
FIG. 5 is a schematic representation of yet another embodiment of the system for herding animals using autonomous vehicles depicted in FIG. 1.

In yet another embodiment, illustrated in FIG. 5, the herding apparatus 120 does not include any physical restraints between the master autonomous vehicle 10a and the client autonomous vehicles 10b. Instead, the herding apparatus 120 may include speakers 42, illustrated in FIG. 1 on a generic autonomous vehicle used with the herding system 110, for emitting tones to direct the group of animals 100 installed on the master autonomous vehicle 10a and the client autonomous vehicles 10b. The tones may be the sound of herding animals, natural predators for the group of animals 100, or any other tones that would cause the group of animals 100 to move. The speakers 42 are in electronic communication with the respective master and client controllers 32a, 32b, and are operated at the direction of the master controller 32a. For, example, in order to move the group of animals 100 in a forward direction, the client autonomous vehicles 10b in the rear of the formation may emit tones 150 causing the group of animals 100 to move away from the tones 150 and in a forward direction, such as how sheepdogs herd a group of sheep, described in a paper "Why we programmed a robot to act like a sheepdog," reprinted from https://theconversation.com/why-we-programmed-a-robot-to-act-like-a-sheepdog-96961 on Jul. 30, 2018 and incorporated herein by reference. The more forward client autonomous vehicles 10b and the master autonomous vehicle 10a may also emit tones 150 to control the movement of the group of animals 100, such as preventing them from moving forward too fast or too far. The emitted tones 150 may be selected from a tones best calculated to move the type of animal or animals in the group of animals 100 by methods known to those skilled in the art.

In an alternate embodiment as illustrated in FIG. 1, in place of speakers 42, or in addition to the speakers 42, each autonomous vehicle 10 may be equipped with lights 43 that may flash in such a manner that causes the group of animals 100 to move.

Figure 6:
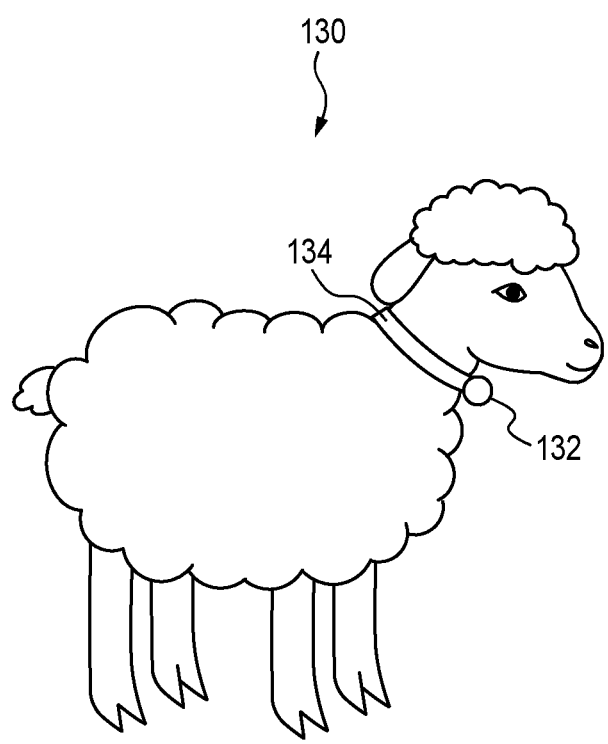
FIG. 6 is an illustration of an animal with an RFID tag according to one embodiment of the system for herding animals.

In embodiments that do not include physical restraints 121, each animal 130 in the group of animals 100, illustrated in FIG. 6, may include an RFID tag 132 embedded in the animal 130 or carried by the animal 130, such as on a collar 134. The herding system 110 may track the animals 130 in the group of animals 100 using the RFID tag 132 by using the master communication unit 40a on the master autonomous vehicle 10a, or, for a larger group of animals 100, using the master and client communication units 40a, 40b on the master and client autonomous vehicles 10a, 10b.

In still yet another embodiment, also illustrated in FIG. 5, the herding system 110 may include a wrangler autonomous vehicle 10c that follows the herding system 110 and, if one animal 130 of the group of animals 100 is detected to have left the formation, may follow the animal 130 or prompt the animal 130 to return to the formation by emitting a tone 150 from a speaker 42 installed on the wrangler autonomous vehicle 10c.

The wrangler autonomous vehicle 10c may include a controller 32c that is in communication through a communication unit 40c with the master controller 32a of the master autonomous vehicle 10a. The wrangler autonomous vehicle 10c may operate like the client autonomous vehicles 10b under the control of the master autonomous vehicle 10a. Alternatively, the wrangler autonomous vehicle 10c may operate independently but in coordination with the master autonomous vehicle 10a, thereby providing the wrangler autonomous vehicle 10c freedom to operate outside the bounds of formation of the herding system 110, but with enough coordination as to pathways, speed, direction, and the like of the herding system 110 to prevent any collisions of the autonomous vehicles 10.

In yet another embodiment, the wrangler autonomous vehicle 10c may operate independently of any master autonomous vehicle 10a as a single vehicle herding system 110.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A system for herding a group of animals, comprising:
   a master autonomous vehicle, the master autonomous vehicle comprising:
      a controller;
      a camera in communication with the controller for supplying image data to the controller;
      a global positioning satellite apparatus for determining a position of the master autonomous vehicle; and
      a ranging unit for determining a distance to an object to the autonomous vehicle in communication with the controller;
   a plurality of client autonomous vehicles, each of the plurality of client autonomous vehicles being operated by the controller of the master autonomous vehicle; and
   a herding apparatus for keeping the group of animals between the master autonomous vehicle and each of the plurality of client autonomous vehicles, comprising:
      a plurality of physical connectors connecting the master autonomous vehicle and the plurality of client autonomous vehicles, such that and wherein the master autonomous vehicle, the plurality of the client autonomous vehicles, and the plurality of physical connectors form a closed loop around the group of animals.

2. The system of claim 1 wherein each of the plurality of physical connectors comprises:
   a bar having a first end and a second end, the first end of the bar being rotatably connected to the master autonomous vehicle or one of the plurality of client autonomous vehicles, and the second end of the bar being rotatably connected to the master autonomous vehicle or another one of the plurality of client autonomous vehicles.

3. The system of claim 2 wherein the bar is connected to one of the master autonomous vehicle or one of the plurality of client autonomous vehicles by a ball joint.

4. The system of claim 1 wherein each of the plurality of physical connectors comprises:

a flexible net having a first end and a second end, the first end of the net being connected to the master autonomous vehicle or one of the plurality of client autonomous vehicles, and the second end of the net being connected to the master autonomous vehicle or another one of the plurality of client autonomous vehicles.

5. The system of claim 1 wherein the herding apparatus further comprises:
a speaker installed on the master autonomous vehicle and each of the plurality of client autonomous vehicles for emitting a sound to direct the group of animals.

6. The system of claim 1 further comprising:
a wrangler autonomous vehicle, the wrangler autonomous vehicle comprising:
a wrangler controller in communication with the controller of the master autonomous vehicle;
a wrangler camera in communication with the wrangler controller for supplying image data to the wrangler controller;
a wrangler global positioning satellite apparatus for determining a position of the wrangler autonomous vehicle; and
a ranging unit for determining a distance to one of the group of animals and in communication with the wrangler controller.

7. The system of claim 6 wherein the wrangler autonomous vehicle follows a loose animal from the group of animals that escapes from the master autonomous vehicle and the plurality of client autonomous vehicles.

8. The system of claim 1 wherein the camera is a thermal imaging camera.

9. The system of claim 1 further comprising:
a radio frequency identification tag affixed to each animal of the group of animals; and
a reader on the master autonomous vehicle in communication with the controller for identifying the radio frequency identification tag affixed to each animal of the group of animals.

10. A system for herding a group of animals, comprising:
a master autonomous vehicle, the master autonomous vehicle comprising:
a controller;
a vehicle-to-vehicle communication unit;
a camera in communication with the controller for supplying image data to the controller;
a global positioning satellite apparatus for determining a position of the master autonomous vehicle; and
a ranging unit for determining a distance to an object to the autonomous vehicle in communication with the controller;
a plurality of client autonomous vehicles, each of the plurality of client autonomous vehicles being operated by the controller of the master autonomous vehicle, each of the plurality of client autonomous vehicles comprising:
a client communication unit for communicating with the master autonomous vehicle;
a client controller in communication with the controller via the client communication unit;
a client camera in communication with the controller for supplying image data to the client controller;
a client global positioning satellite apparatus for determining a position of each of the plurality of client autonomous vehicles; and
a ranging unit for determining a distance to an object in communication with the client controller; and
a herding apparatus for keeping the group of animals between the master autonomous vehicle and each of the plurality of client autonomous vehicles, comprising:
a plurality of physical connectors connecting the master autonomous vehicle and the plurality of client autonomous vehicles, such that and wherein the master autonomous vehicle, the plurality of the client autonomous vehicles, and the plurality of physical connectors form a closed loop around the group of animals.

11. The system of claim 10 wherein each of the plurality of physical connectors comprises:
a bar having a first end and a second end, the first end of the bar being rotatably connected to the master autonomous vehicle or one of the plurality of client autonomous vehicles, and the second end of the bar being rotatably connected to the master autonomous vehicle or another one of the plurality of client autonomous vehicles.

12. The system of claim 10 wherein each of the plurality of physical connectors comprises:
a flexible net having a first end and a second end, the first end of the net being connected to the master autonomous vehicle or one of the plurality of client autonomous vehicles, and the second end of the net being connected to the master autonomous vehicle or another one of the plurality of client autonomous vehicles.

13. The system of claim 10 wherein the herding apparatus further comprises:
a speaker installed on the master autonomous vehicle and each of the plurality of client autonomous vehicles for emitting a sound to direct the group of animals.

14. The system of claim 10 further comprising:
a wrangler autonomous vehicle, the wrangler autonomous vehicle comprising:
a wrangler controller in communication with the controller of the master autonomous vehicle;
a wrangler camera in communication with the wrangler controller for supplying image data to the wrangler controller;
a wrangler global positioning satellite apparatus for determining a position of the wrangler autonomous vehicle; and
a ranging unit for determining a distance to one of the group of animals and in communication with the wrangler controller.

15. The system of claim 14 wherein the wrangler autonomous vehicle follows a loose animal from the group of animals that escapes from the master autonomous vehicle and the plurality of client autonomous vehicles.

16. The system of claim 10 further comprising:
a radio frequency identification tag affixed to each animal of the group of animals; and
a reader on the master autonomous vehicle in communication with the controller for identifying the radio frequency identification tag affixed to each animal of the group of animals.

* * * * *